Aug. 17, 1965    K. R. BRAGG    3,201,149
TUBE COUPLING
Filed Dec. 1, 1961
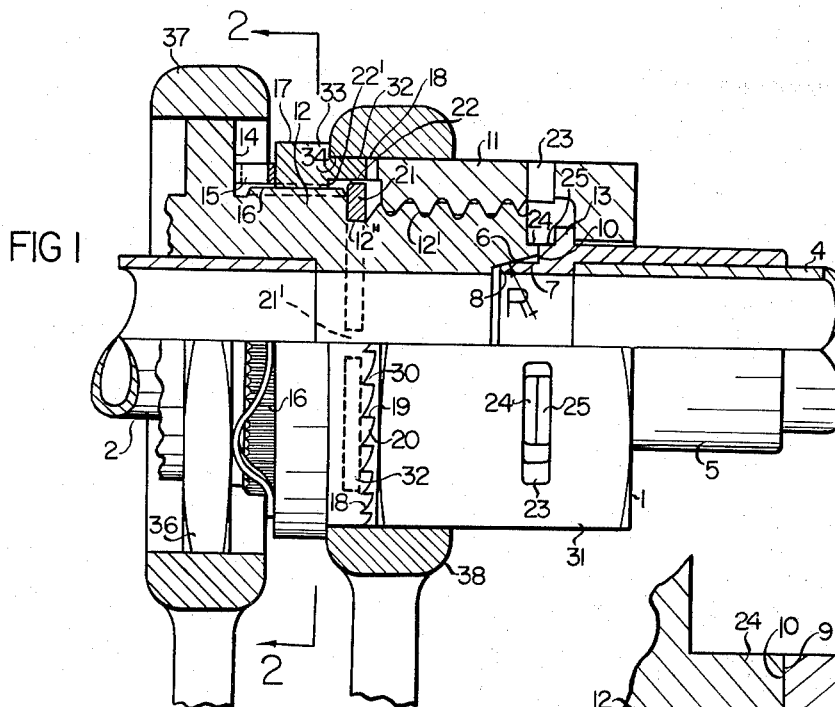
FIG 1
FIG 3
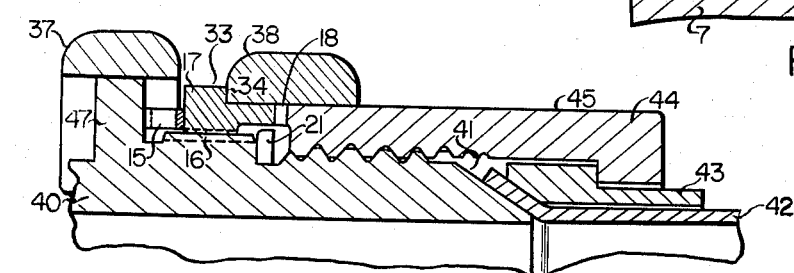
FIG 4
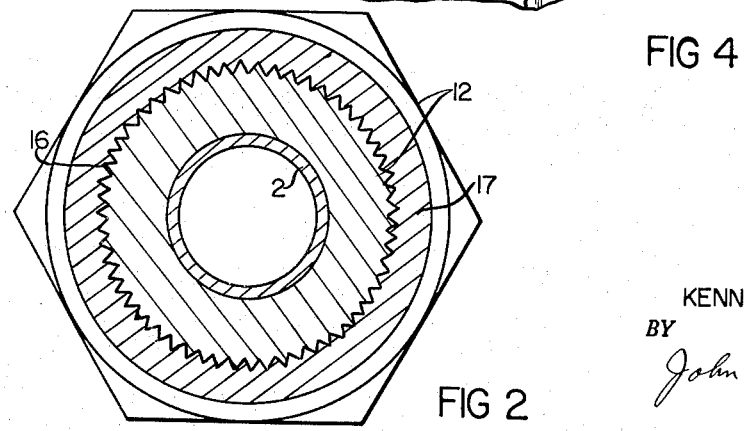
FIG 2
INVENTOR.
KENNETH R. BRAGG
BY
John N. Wolfram
ATTORNEY

United States Patent Office 3,201,149
Patented Aug. 17, 1965

3,201,149
TUBE COUPLING
Kenneth R. Bragg, Manhattan Beach, Calif., assignor to Parker-Hannifin Corporation, Cleveland, Ohio, a corporation of Ohio
Filed Dec. 1, 1961, Ser. No. 156,336
5 Claims. (Cl. 285—39)

The present invention relates generally to tube couplings and more particularly to a tube coupling which is provided with ratchet type means for locking the coupling parts in properly assembled condition.

It is a principal object of this invention to provide a simple, compact, and foolproof locking arrangement for tube coupling parts.

It is another object of this invention to provide a locking mechanism of the character indicated in which the locking element may be yieldably shifted to a position permitting disassembly of the tube coupling.

It is another object of this invention to provide a locking ratchet mechanism for a tube coupling in which, when it is desired to tighten the joint, it is necessary merely to screw one of the coupling parts onto another until the joint is properly made up and at which position the coupling is automatically locked.

It is yet another object of this invention to provide a tube coupling or union of the character indicated in which visual means are provided for determining when it is properly assembled.

It is yet another object to provide a latching mechanism which can be disengaged by the standard tools which are normally used to disassemble the tube coupling and to avoid the use of disengaging devices which might be inadvertently left on the coupling and thus nullify the locking feature.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but two of the various ways in which the principle of the invention may be employed.

In said annexed drawings:

FIG. 1 is a side elevation view, partly in radial section, showing an embodiment of the present invention as applied to one form of tube coupling;

FIG. 2 is a cross-section view taken substantially along the line 2—2 of FIG. 1, FIG. 3 is an enlarged fragmentary view of abutting portions of the coupling, and FIG. 4 is a partial section view of the invention as applied to another form of tube coupling.

Referring now more particularly to the drawing, the tube coupling 1 comprises a first tube 2 having a female coupling part or body 12 brazed or otherwise secured at one end thereof, and a second tube 4 having a male coupling part 5 brazed or otherwise secured on the end thereof. The female coupling part 12 is provided with a frusto-conical seat 6 with which the resiliently deformable lip 7 of the male coupling part 5 is in fluid-tight contact. The outer face 8 of the lip 7 is preferably rounded at a radius R as indicated to initially make line contact with the conical seat 6. Said female and male coupling parts 12 and 5 are preferably made of corrosion-resistant alloy and it is desired to deform the lip 7 a very slight amount within its elastic limit determined by abutement of the annular transverse faces 9 and 10 of said coupling parts.

The female and male coupling parts 12 and 5 are drawn together to establish the fluid-tight joint between the resilent lip 7 and the conical seat 6 as by means of nut 11 threadedly interengaged with body 12, the nut 11 being engaged with the peripheral flange 13 on the male coupling part 5 for this purpose. It can be seen, therefore, that when the nut 11 and body 12 are screwed together, the lip 7 will engage the conical seat 6 and will be resiliently wedged radially inwardly thereby to establish a fluid-tight joint.

The body 12 has a shoulder 14 against which is disposed one or more wavy spring washers 15. Axially slidably keyed to body 12, as by interengaged axial splines 16, is a lock ring 17. The wavy spring washer 15 bears on said lock ring 17 to constantly urge it toward nut 11. The abutting end faces of the lock ring 17 and said nut 11 are formed with interfitting ratchet teeth 18 of generally saw-tooth form, as shown, including axial portions 19 and inclined portions 20, whereby when the coupling is assembled, the nut 11 and body 12 can be screwed together while the teeth 18 click over each other due to inclined portions 20. However, the provision of the axial portions 19 on such teeth 18 prevent unscrewing of the nut 11 from the body 12 except first by retracting the lock ring 17 to disengage the teeth 18.

The body 12, adjacent the threads 12' thereof, is formed with a peripheral groove 12" in which is disposed a snap ring 21 having a split 21' and which serves as a retainer for the lock ring 17. Lock ring 17 has a counterbore 22 which terminates in a transverse shoulder 22' provided by the right hand edges of the splines 16 in the lock ring. When the coupling 1 is in disassembled condition, the wavy spring washer 15 urges the lock ring 17 toward the right as viewed in FIG. 1, but only to the extent where the shoulder 22' therein engages the snap ring 21. As is evident from the drawings, when snap ring 21 is engaged by shoulder 22', the outer wall of the counterbore or recess 22 surrounds snap ring 21 to prevent its dislodgment from groove 12" and also prevents lock ring 17 from overlapping any substantial portion of the external thread 12' of the body whereby the nut may be readily engaged with the body thread when attaching the same to the body.

When it is desired to disassemble the coupling 1, the lock ring 17 may be pressed toward the left as viewed in FIG. 1, to disengage the ratchet teeth 18 thereof from the ratchet teeth 18 of the nut 11, whereupon the nut 11 and body 12 may be turned with respect to each other to open the coupling 1. Nut 11 has a cylindrical portion 30 at the leftward end thereof in which the ratchet teeth 18 of the nut are formed. Adjacent cylindrical portion 30 the nut is formed with a hexagonal or other non circular portion 31, the diameter of an inscribed circle of such hexagonal portion, or in other words the distance across the flats of hexagon 31, being no smaller than the diameter of cylindrical portion 30.

Lock ring 17 has a cylindrical portion 32 in which its ratchet teeth 18 are formed, the diameter of such cylindrical portion 32 being no larger than the diameter of the above mentioned inscribed circle for hexagon 31. Lock ring 17 also has an enlarged portion 33 forming a transverse shoulder 34, the diameter of portion 33 being larger than the diameter of the inscribed circle of hexagonal portion 31 and smaller than the inscribed circle of a hexagonal, or other non-circular portion 36 of body member 12.

With this arrangement, when it is desired to disassemble the coupling, a standard wrench 37 may be applied to hexagon 36. At the same time, another standard wrench 38 may be applied to nut hexagon 31 and moved to the left to engage shoulder 34 on lock ring 17. At this point an operator will normally be grasping wrench 37 in one hand and wrench 38 in the other but before the wrenches can be manipulated for unthreading nut 11 from body member 12, the operator will slide wrench 38 further to the left and by means of the engagement between shoulder 34 and wrench 38 will slide lock ring 17 to the left along splines 16 so as to disengage the ratchet connection 18 between lock ring 17 and nut 11. Since enlarged portion 33 of the lock ring is smaller than hexagon 36 it will be received within the opening of wrench 37 without interference in the event wrench 37 partly overlies lock ring 17. In this manner the operator may readily disengage ratchet teeth 18 while both hands are holding the wrenches.

Another feature of this invention is that the nut 11 is formed with one or more slots or holes 23 to view the area where faces 9 and 10 abut each other. If these faces are not in engagement, this is an indication that the coupling 1 is not properly assembled. To facilitate such determination of proper assembly, the cylindrical faces 24 and 25 are coaxial and of equal diameter with sharp corners at the intersections of faces 9-24 and 10-25, as shown in FIG. 3. The faces 24 and 25 also are highly polished and smooth. Accordingly, when the joint 9-10 is viewed through the slots 23, it will barely be visible or perhaps invisible owing to absence of shadows or ridges when the faces 9-10 are in firm abutting engagement as they should be in the properly assembled coupling 1. On the other hand, if the faces 9 and 10 are not in engagement, even a gap of 0.002" can easily be seen with the naked eye, and a gap of 0.0005" or less can be seen as with a dentist's magnifying mirror.

FIG. 4 shows the invention as applied to a coupling for flared tubes. In this instance tube coupling body 40 has a tapered seat 41 against which a flared tube 42 is adapted to be clamped by means of a sleeve 43 and nut 44, the nut being threaded onto body 40. The wrench engaging portion 45 of the nut is preferably hexagonal, as is the wrench engaging portion 47 of the body. The inscribed diameters, or distance across the flats, of the wrench engaging portions have the same relation to the diameter of the ratchet teeth portions and the enlarged diameter portion of lock ring 17 as in the form of FIG. 1. The locking elements of FIG. 4 are identical to those of FIG. 1 and bear the same reference numerals and thus no further description of FIG. 4 is necessary.

Other modes of applying the principle of the invention may be employed, change being made as regards the details described, provided the features stated in any of the following claims, or the equivalent of such, be employed.

I, therefore particularly point out and distinctly claim as my invention:

1. A tube coupling having means providing for the attachment of at least one tube thereto, said coupling including a tube coupling body having an external screw thread at one end and a wrench engaging portion at the other end, a lock ring axially slidably mounted on said tube coupling body between the ends thereof and keyed thereto against relative rotation therewith, a nut threaded onto said external thread and having an adjacent end portion with ratchet teeth thereon, said nut also having a wrench engaging portion adjacent said teeth, a spring means disposed between said wrench engaging portion of said tube coupling body and said lock ring for urging said lock ring toward said nut, said lock ring having an end portion on which there are formed ratchet teeth engageable with said nut ratchet teeth for locking said nut against unthreading rotation, said lock ring also having an annular portion of greater diameter than said wrench engaging portion of said nut, whereby a wrench fitted to said wrench engaging portion of said nut may be moved axially therealong into engagement with said annular portion on said lock ring for moving said lock ring to disengage said teeth whereby said nut may be unthreaded from said body, said wrench engaging portion of said tube coupling body being of a diameter at least as great as said annular portion on said lock ring whereby a wrench may be fitted to said body wrench engaging portion without interference from said lock ring.

2. The tube coupling of claim 1 wherein there are axially extending splines intermediate said external screw thread and said wrench engaging portion on said tube coupling body, said splines being of large diameter than said thread to permit said lock ring having internal splines for engagement with said external splines to be passed over said threads; there is a groove between said external screw thread and said splines; and there is a retainer ring mounted in said groove for retaining said lock ring on said tube coupling body.

3. The coupling of claim 1 further comprising a second coupling body, said nut being operative to engage a flange on said second coupling body to force said coupling bodies together upon tightening of said nut on said first coupling body, said coupling bodies, in properly clamped together position, having abutting coaxial cylindrical portions of substantially equal diameter, one of said coupling bodies having a lateral opening through which said cylindrical portions are visible to discern a gap therebetween when said coupling bodies are not properly clamped together.

4. The coupling of claim 3 wherein said cylindrical portions are polished and have sharp corners at their abutting faces to render the line of abutment practically invisible whereby even a minute gap is visible.

5. The coupling of claim 4 in which the abutting surfaces of said cylindrical portions are substantially at right angles to the axis of said coupling.

References Cited by the Examiner

UNITED STATES PATENTS

| | | | |
|---|---|---|---|
| 592,991 | 11/97 | Lewis | 285—93 |
| 1,703,696 | 2/29 | Stratford | 285—412 |
| 2,049,289 | 7/36 | Burns | 285—330 |
| 2,125,677 | 8/38 | Kuchenmeister | 285—93 |
| 2,413,308 | 12/46 | Arnold | 285—39 |
| 2,470,508 | 5/49 | Maky | 285—334.5 |
| 2,491,406 | 12/49 | Zeeb | 285—89 |
| 3,069,187 | 12/62 | Collins | 285—110 |

FOREIGN PATENTS

| | | |
|---|---|---|
| 917,287 | 9/46 | France. |

CARL W. TOMLIN, *Primary Examiner.*